Feb. 8, 1949.　　　F. W. STANKE ET AL　　　2,460,856
SUSPENSION HANGER
Filed March 13, 1941　　　　　　　　　　　　　2 Sheets-Sheet 1
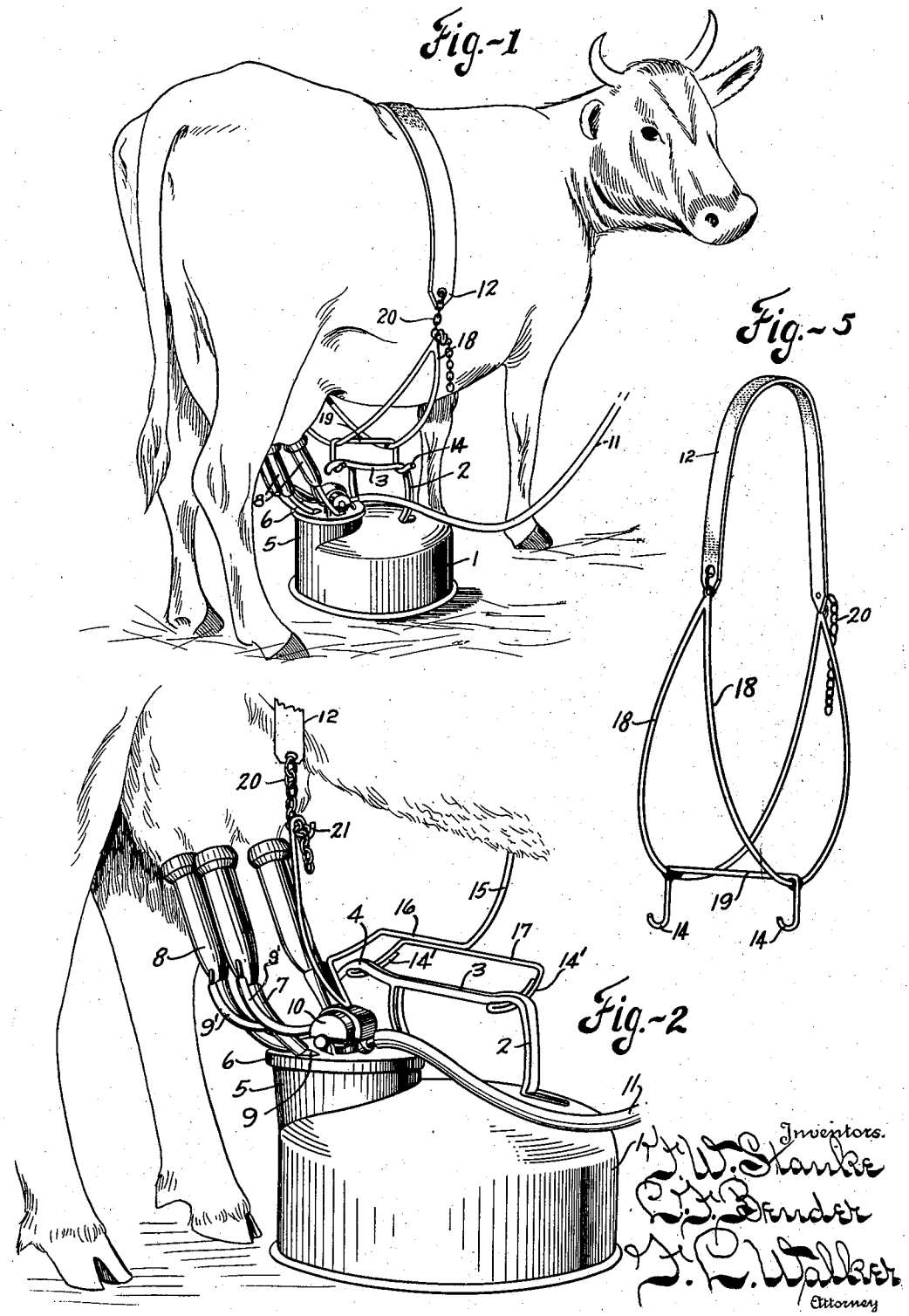

Feb. 8, 1949. F. W. STANKE ET AL 2,460,856
SUSPENSION HANGER
Filed March 13, 1941 2 Sheets-Sheet 2
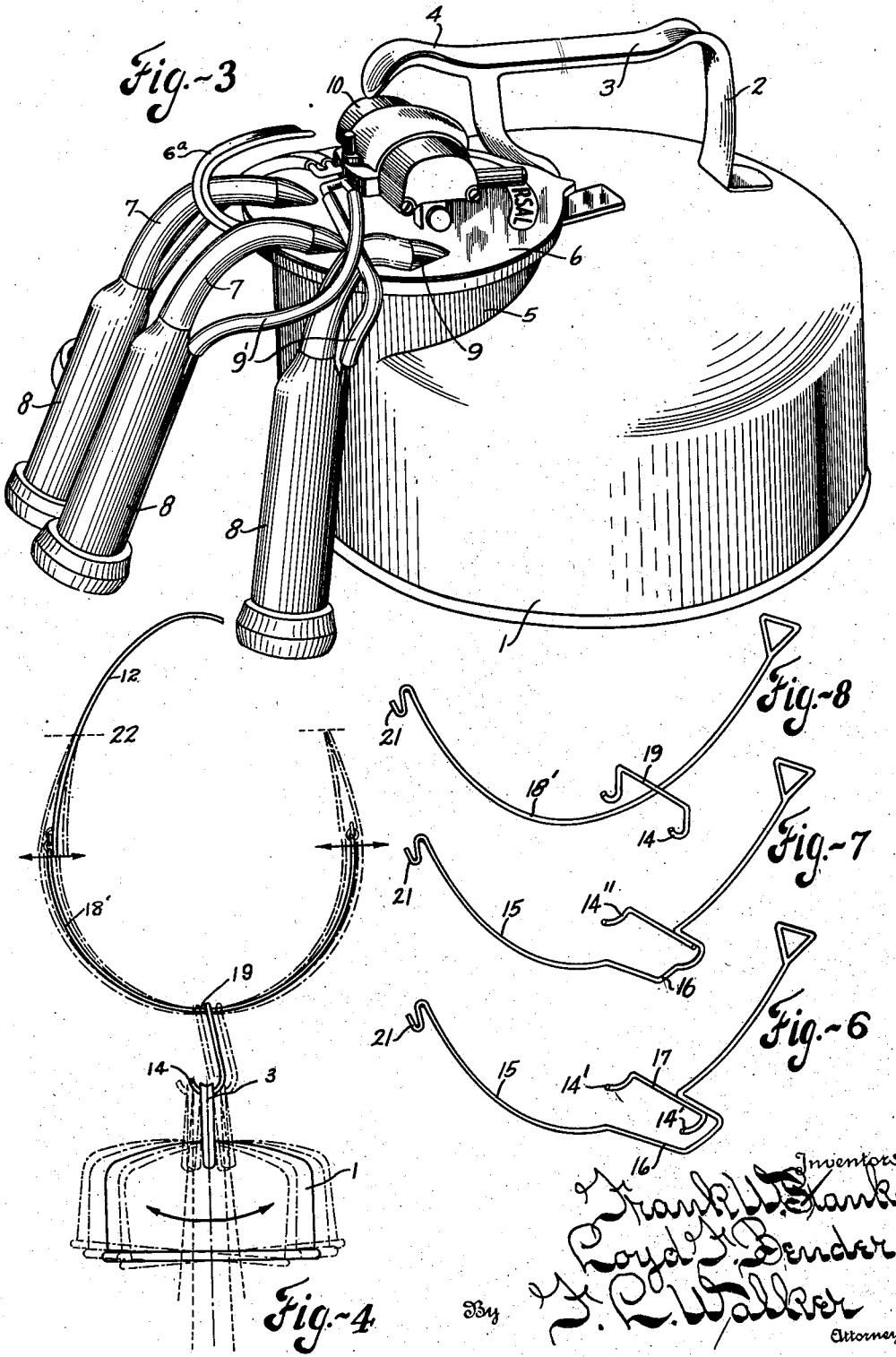

UNITED STATES PATENT OFFICE 2,460,856

SUSPENSION HANGER

Frank W. Stanke, Milwaukee, and Lloyd F. Bender, Waukesha, Wis., assignors to The Universal Milking Machine Company, Waukesha, Wis., a corporation of Wisconsin Application March 13, 1941, Serial No. 383,192

4 Claims. (Cl. 31—58)

This invention pertains to milking apparatus of the suspensory type, wherein a milk receiver and interconnected teat cups are suspended upon a hanger supported upon a cow's back.

A characteristic feature of the present apparatus is that the milk receiver is supported upon a two-point suspension for lateral rocking motion to and fro about an axis longitudinally of the cow, and is substantially resistant to fore and aft oscillation. The present disclosure is a further development and improvement of that disclosed in copending application Serial No. 316,602, filed January 31, 1940, now matured into Letters Patent No. 2,340,297, issued February 1, 1944.

The object of the invention is to improve the construction, as well as the means and mode of operation of suspensory type milking apparatus, whereby it may not only be economically manufactured and operated, but will be more efficient in use, automatic in action, uniform in operation, having few operating parts, and unlikely to get out of repair.

A further object of the invention is to provide a suspensory device or hanger of the surcingle type having double point support for a milk receiver.

A further object of the invention is to provide an improved mounting or hanger upon which the milk receiver will be hinged for rocking or cradle motion transversely of the cow and about a fore and aft axis.

A further object of the invention is to provide an improved mode of alternating operation wherein any tension or tugging action transmitted to the teats will be exerted alternately upon different teats, as distinguished from a fore and aft swinging motion wherein all the teats are subjected simultaneously to the influence thereof.

A further object of the invention is to provide a suspensory hanger and a method of mounting a milk receiver thereon for free lateral swinging or rocking motion, which will minimize strain upon the teat cups and cow's teats and obviate strangulation thereof.

A further object of the invention is to provide an improved method or mode of mechanical milking which will result in more uniform and complete milking, and which will minimize the necessity for subsequent hand stripping.

A further object of the invention is to provide a suspensory type milking apparatus having the advantageous structural features and the inherent meritorious characteristics and improved method of operation herein mentioned.

A further, but none the less important, object of the invention is to produce a reaction and influence upon the cow in simulation of a sucking calf.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the accompanying drawings, wherein is shown the preferred but obviously not necessarily the only form of embodiment of the invention, there is illustrated in Fig. 1 a milking apparatus and support therefor embodying the present invention suspended upon a cow.

Fig. 2 is a perspective view of the milking apparatus and preferred modified form of a suspensory hanger observed from a different point of view in its relation to the cow.

Fig. 3 is a perspective view of the milker unit, including the receiver or pail, the cluster of teat cups and the pulsator device in assembled relation but removed from the suspensory hanger.

Fig. 4 is a diagrammatic view of the milk receiver and suspensory hanger viewed in a fore and aft direction coincident with the axis of oscillation of the milk receiver and indicating diagrammatically the compound or dual swinging motion induced during the milking operation.

Fig. 5 is a perspective view of the supporting hanger, as shown in Fig. 1, by which the milk receiver is mounted for transverse oscillatory motion.

Figs. 6, 7 and 8 illustrate further modifications of the hanger member.

Like parts are indicated by similar characters of reference throughout the several views.

Milking apparatus to be suspended from the cow's back during milking operation has long been known. Such devices have not ordinarily been mounted for oscillatory motion, and when capable of such motion they have been suspended from a single point or impelled in a fore and aft direction by the reaction of the pulsating mechanism. The present structure differs therefrom by providing for controlled bi-lateral oscillation transversely of the cow on which the apparatus is mounted about a definite fore and aft axis, by which any tugging action is transmitted alternately to different teats to which the apparatus is connected. In this respect and others it differs materially from prior art devices and induces an improved milking action which induces a better response by the cow and results in more complete and uniform milking operation, leaving less residue of milk to be removed by hand stripping.

Referring to the drawings, 1 is the milk receiver, having an upstanding bail or handle 2, the top 3 of which is continued as an overhanging cantilever arcuate arm 4. The receiver 1 is provided with a short neck or spout 5 upon which is a removable cover 6. Flexible milk tubes 7 connect a group of double wall pulsating teat cups 8 with nipples 9 projecting from the spout lid 6, through which the teat cups communicate with the interior of the receiver 1. A handle 6a is provided (Fig. 3) by which the lid and teat cup assembly may be conveniently carried when removed from the receiver. Air tubes 9' connect the several teat cups 8 with a pulsator unit 10 mounted on the spout lid 6. An air exhaust conduit 11 connects alternating pairs of teat cups 8 and also the interior of the receiver 1 with a vacuum chamber or with a pump (not shown) by which vacuum is maintained within the receiver 1 and the pulsating chambers of the teat cups are alternately subjected to exhaustion and opened to atmosphere.

The milk receiver 1 is suspended from the cow's back by a surcingle 12, to which is secured a bow-shaped hanger member preferably formed from a metal rod. This hanger member may be of various forms, the preferable shape being that shown in Figs. 2 and 6. In any event, the hanger includes a pair of relatively spaced fingers or hooks 14 which are aligned in a fore and aft direction when the hanger is mounted on a cow.

The hooks or fingers 14 are detachably engaged with the bail of the milk receiver 1, by engaging one hook or finger 14 beneath the transverse top 3 of the bail adjacent to one side thereof and engaging the other finger or hook beneath the overhanging cantilever extension 4 of the bail. Obviously, the bail or handle might be made of sufficient width to enable both of the relatively spaced fingers or hooks 14 to be engaged beneath the transverse top 3 of the bail and intermediate the upright legs thereof. However, the projected end 4 of the bail which as particularly shown in Fig. 3 overhangs the pulsator unit enables a more compact construction and prevents interference of a wider bail with the spout and the parts mounted thereon. It also facilitates the engagement and disengagement of the receiver with the hanger.

As shown in Figs. 2 and 6, the preferred form of hanger comprises an arcuate rod 15 having formed therein a medial lateral bight 16. Located partially within the bight 16 in symmetrical relation with the arcuate hanger rod 15 is a U-shaped member 17, of which the receiver supporting fingers 14' comprise the parallel sides. The fingers 14' may be of simple form as shown in Fig. 6 or may double back upon themselves as shown in Fig. 2. The substantially U-shaped member 17 is disposed with its parallel arcuate side fingers or hooks 14' extending substantially horizontally with their concave sides uppermost, and is fixedly welded in such relation to the rod 15 coincident with one side of the bight 16 thereof.

Merely as illustrative of an alternative form of hanger, there is shown in Figs. 1 and 5 a double U-shaped frame, comprising two arcuate rods 18 disposed in inclined relation to each other and interconnected at their ends with their mid-bight portions spaced apart and held by a transverse inverted U-shaped member 19, the dependent parallel ends of which are formed into the hooks 14. One of these hooks is engageable beneath the top 3 of the bail and the other beneath the extended arcuate arm 4 thereof as before described, and as shown in Fig. 1.

One end of each hanger 15 and 18 is permanently attached to one end of the strap or surcingle 12, while the other end is adjustably connected thereto to enable the apparatus to be applied to cows of different size. Cows vary greatly in size and shape. To accommodate the apparatus to different cows, one end of the surcingle is provided with a chain extension 20 which is engageable at different points in a terminal hook 21 on the hanger member. The hook is not necessarily engaged in the eye of a link of the chain, but any link is engageable flatly in the bight of the hook against which the succeeding link of the chain will then abut. This enables the hanger to be more quickly applied and removed.

Obviously, the hanger member may be variously formed, always, however, in such shape as to suport the receiver 1 for bi-lateral swinging motion about a fore and aft axis.

In Fig. 7 there is illustrated a modification of the hanger shown in Figs. 2 and 6, wherein one side of the bight 16 is directly engaged by the bail arm 14'' in lieu of a second hook or finger 14'. In Fig. 8 the hanger of Figs. 1 and 5 is shown with a single supporting bow 18' instead of the double bows 18.

The milk receiver movement is graphically illustrated in Fig. 4. The bow-shaped hanger member, whether it be in the form of Figs. 5, 6, 7 or 8, is somewhat wider than the body of the cow. The surcingle 12 will conform to the upper portion of the cow's back when suspended thereon, but from approximately the point 22 to the connection with for example, the hanger 18' the surcingle will extend divergently away from the cow's sides. As a result, the hanger 18' suspended on the opposite ends of the surcingle as upon parallel links will be free for limited to and fro parallel motion transversely of the cow. The milk receiver 1 suspended upon the hooks or fingers 14 is capable of further transverse to and fro motion additional to that of the hanger about a fore and aft axis coincident with the dual suspension points of the receiver upon the spaced hooks 14. Theoretically, the entire hanger and suspended milk receiver are initially movable first in one direction and then in the other about the two points 22 where the surcingle meets the cow's sides, and the receiver is capable of further synchronous eccentric swinging movement independently of and relative to the hanger about its suspension point on the hooks or fingers 14. This bi-lateral swinging motion of the receiver and hanger is induced by the alternating action of the pulsator 10, which energizes the pair of teat cups at one side and then the opposite pair by alternate exhaustion and admission of air to the pulsating chambers thereof. This alternation between the teats at one side and then at the opposite side, thereby effecting a bi-lateral milking action, is in accordance with the natural division of the cow's nervous system into right and left. While two teats are being milked, the opposite pair of teats are being massaged in imitation of the natural action of the calf in sucking. The calf exerts just enough suction to extract the milk and then in swallowing the withdrawn milk it effects a massaging action upon the teat from its end toward the udder. The present smooth, rolling, side to side alternating action with a low vacuum operation of ten inches or less applied to the opposite pair of teats in synchronism with the side sway motion, enables the milking to be accomplished faster and more completely and without injury to the cow.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. In a milking apparatus, a suspensory hanger including a bow to extend beneath a cow, a surcingle interconnecting the ends of the bow and extending over the cow's back, relatively spaced suspension supports upon the bow disposed in aligned relation transversely thereof, a milk receiver having double point suspension upon the spaced supports for transverse oscillatory motion in opposite directions from vertical about a fore and aft axis, teat cups and flexible milk tubes interconnecting the swinging milk receiver with the cow's teats, and a pulsator mechanism for imparting suction influence to the teat cups at one side of the axis of oscillation alternately with the imparting of like suction influence to the teat cups at the opposite side of the axis of oscillation, the construction and arrangement being such that swinging motion will be transmitted to the milk receiver first in one direction past vertical position and then in the opposite direction past vertical position, wherein the milk receiver will describe a swinging movement in an arc of short radius, the swinging movement of the milk receiver operating to impart a tugging action alternately to different portions of the cow's teats.

2. A milking apparatus of the type wherein a milk receiver is suspended beneath a cow upon a suspension member engageable with the cow's back by means of a surcingle extending thereover, characterized by a hanger bow member, the ends of which are secured to the surcingle, spaced aligned bearings on the hanger upon which the milk receiver may be suspended beneath the cow independently of connection with the cow's teats, and by which it may have to and fro swinging motion transversely of the cow about a fore and aft axis in alternating directions past vertical position, a plurality of pneumatic pulsating teat cups and milk tubes connecting the milk receiver with the cow's teats, including a pair of teat cups connected with the cow's teats at one side of the axis of oscillation of the milk receiver and a pair of teat cups connected with the cow's teats at the opposite side of the axis of oscillation, and pulsator mechanism controlling the admission and exhaustion of air to and from the pairs of teat cups at the opposite sides of the axis of oscillation alternately, the construction and arrangement being such that the admission and exhaustion of air to and from the respective pairs of teat cups alternately induces to and fro swinging motion of the milk receiver and that tugging influence is transmitted to the respective pairs of teats alternately, in unison with the to and fro swinging motion of the milk receiver past vertical position.

3. A milking apparatus wherein a milk receiver is suspended beneath a cow independently of connection with the cow's teats and may have to and fro lateral swaying motion transversely of the fore and aft direction of the cow, including pneumatic pulsating teat cups flexibly connected with the receiver, a hanger comprising a bow member to extend transversely beneath the cow, and a surcingle connecting the ends of the bow member over the cow's back, a pair of spaced supports disposed on opposite sides of the plane of the bow and aligned transversely thereof in a fore and aft direction relative to the cow, the milk receiver being suspended upon the spaced hanger supports for to and fro oscillation transversely of the cow about a fore and aft axis, and pulsator mechanism for admitting and exhausting air to and from teat cups at opposite sides of the axis of oscillation alternately, the construction being such that the alternate admission and exhaustion of air to and from opposite teat cups transmits to the milk receiver oscillatory motion first in one direction and then in the other.

4. In a milking apparatus, a suspensory hanger for supporting a milk receiver including a bow to extend beneath a cow, a surcingle connecting the ends of the bow and to extend over the cow's back on which it is supported, the spacing of the ends of the bow being greater than the transverse thickness of the cow's body in the plane of the hanger whereby the ends of the surcingle will extend divergently from the cow's sides to their juncture with the ends of the bow, and the latter will be capable of to and fro swinging motion upon the ends of the surcingle in an arc concentric with the point of engagement thereof upon the cow's back, relatively spaced supports carried by the hanger bow aligned transversely thereof, and a milk receiver suspended upon the relatively spaced supports and movable to and fro in unison with the movement of the bow and capable of further oscillatory movement in like direction independent thereof in an arc concentric with its points of suspension upon the spaced supports about a fore and aft axis common to the spaced supports.

FRANK W. STANKE.
LLOYD F. BENDER.

REFERENCES CITED

The following references are of record in the file of this patent:

UNITED STATES PATENTS

| Number | Name | Date |
|---|---|---|
| 473,770 | Murchland | Apr. 26, 1892 |
| 583,165 | Bender | May 25, 1897 |
| 636,446 | Norby | Nov. 7, 1899 |
| 655,200 | Condron | Aug. 7, 1900 |
| 965,193 | Jonsson | July 26, 1910 |
| 1,408,326 | Wilmotte | Feb. 28, 1922 |
| 1,859,213 | McCornack | May 17, 1932 |
| 2,050,356 | McCornack | Aug. 11, 1936 |
| 2,340,297 | Schmitt et al. | Feb. 1, 1944 |

FOREIGN PATENTS

| Number | Country | Date |
|---|---|---|
| 22,956 | France | Mar. 28, 1921 |
| 25,479 | Sweden | Sept. 19, 1908 |
| 31,634 | Sweden | Oct. 7, 1911 |